3,214,440
REACTION PRODUCTS OF MITOMYCINS
AND PORFIROMYCIN
Donna Bernice Cosulich, Pearl River, James Burns
Patrick, Suffern, and Richard Preston Williams, Tompkins Cove, N.Y., assignors to American Cyanamid
Company, Stamford, Conn., a corporation of Maine
No Drawing. Filed Nov. 2, 1964, Ser. No. 408,314
3 Claims. (Cl. 260—319)

This application is a continuation-in-part of our copending application Serial No. 250,027, filed January 8, 1963, now abandoned, which in turn is a continuation-in-part of application Serial No. 49,176, filed August 12, 1960.

This invention relates to a novel group of antibiotics and, more particularly, is concerned with a novel series of active antibacterial agents derived by reaction of certain of the mitomycin group of antibiotics with certain classes of mercaptans.

Certain of the starting materials for the preparation of the novel compounds of this invention are in themselves novel antibiotics produced by cultivation of appropriate strains of *Streptomyces verticillatus* ATCC Nos. 13,495; 13,538 and 13,539. These novel elaboration products, formerly designated β, γ₁ and γ₂, are now known, respectively, as mitomycin A, mitomycin B and porfiromycin. Structure elucidation of mitomycins A, B and C and porfiromycin is described by J. S. Webb et al. in J.A.C.S., 84, 3185 (1962).

Another class of suitable starting materials for the preparation of the novel products of this invention are the N-substituted derivatives of mitomycin A and mitomycin C which form the subject matter of the copending application of Meyer et al., Serial No. 200,631, filed June 7, 1962.

For convenience, the structures of the mitomycins and porfiromycins referred to above are reproduced below.

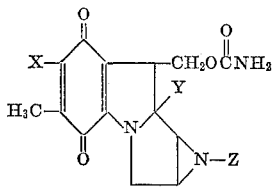

| Compound | X | Y | Z |
| --- | --- | --- | --- |
| Mitomycin A | H₃CO | OCH₃ | H |
| Mitomycin B | H₃CO | OH | CH₃ |
| Mitomycin C | H₂N | OCH₃ | H |
| Porfiromycin | H₂N | OCH₃ | CH3 |

The N-substituted derivatives of mitomycin A and mitomycin C may be represented by the following general formula:

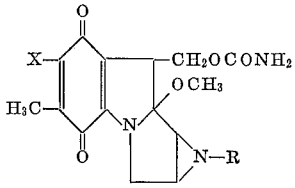

wherein X is lower alkoxy or amino; and R is lower alkyl, lower alkanoyl, phenyl lower alkyl, benzoyl, phenyl carbamoyl, lower alkyl sulfonyl, phenylsulfonyl and lower carboalkoxy.

In accordance with the present invention we have discovered that it is possible to prepare highly useful antibacterial agents by reaction of the foregoing groups of antibiotics with certain mercapto compounds.

The novel antibiotics of this invention are, in general, colored crystalline solids of relatively limited solubility in water, but somewhat more soluble in lower alkanols, ethyl acetate, acetone, toluene, benzene, chloroform, and the like.

Useful mercaptans and mercapto compounds are alkyl mercaptans, aromatic mercaptans, arylalkyl mercaptans, mercaptoalcohols and mercaptocarboxylic acids. More particularly, these compounds may be represented by the formula R—SH, wherein R is selected from the group consisting of lower alkyl, mercapto lower alkyl, hydroxy lower alkyl, amino lower alkyl, phenyl or phenyl lower alkyl.

The structures of the reaction products of the five starting antibiotics with the stated mercaptans is unknown at the present, and accordingly, these products are defined as the reaction products of the defined mercaptans with mitomycin A, mitomycin B, mitomycin C, porfiromycin, and N-substituted derivatives of mitomycin A and mitomycin C. These starting materials may be represented by the following general formula:

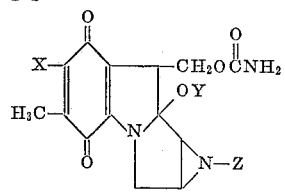

wherein X is amino or lower alkoxy, Y is hydrogen or methyl, and Z is hydrogen, lower alkyl, lower alkanoyl, phenyl lower alkyl, benzoyl, phenyl carbamoyl, lower alkyl sulfonyl, phenyl sulfonyl and lower carboalkoxy.

It is an advantage of this invention that the novel reaction products may be prepared for the most part in simple reaction media. Ordinarily water is used as a reaction medium, but other liquids such as lower alkanols, ethyl acetate, benzene, toluene, chloroform, or the like can be used.

Typically, the starting material is dissolved in a suitable volume of water, and any excess of mercaptan either alone or dissolved in water or other suitable solvent is added with stirring. Very often the progress of the reaction is accompanied by a visible color change or a shift in the ultraviolet absorption spectrum. In general, after the reaction is completed or largely completed, the reaction medium and excess reactant may be removed by vacuum distillation, and the product may then be recovered by conventional means such as crystallization, chromatography, and the like. The novel antibiotics of this invention and the starting antibiotics are sensitive to acid and to high temperatures, and in consequence, care must be taken to avoid their exposure to these two conditions. When distillation is employed, for example, to remove reaction medium and excess reactant, a high enough vacuum should be maintained to keep the temperature low.

It is thought likely from the behavior of the novel antibiotics of this invention that for the most part the reaction product of a single starting antibiotic and a single mercaptan will be a single compound. Rigorous proof of this fact, however, has not always been possible, and it might be that in some instances mixtures of products result.

The novel antibiotics of this invention have broad-spectrum activity against a number of microorganisms and thus are useful antibacterial agents. The new antibiotics show in vitro activity in standard, scientifically recognized microbiological assays, against the following organisms:

*Klebsiella pneumoniae* "A" strain AD
*Bacillus cereus* ATCC 10702

Mycobacterium smegmatis ATCC 607
Streptococcus pyogenes β hemolytic
Escherichia coli ATCC 9637
Salmonella gallinarum
Staphylococcus aureus ATCC 6538
Pseudomonas aeruginosa ATCC 10145
Streptococcus faecalis
Staphylococcus albus No. 69
Streptococcus sp. β hemolytic No. 80
Staphylococcus aureus NY 104
Corynebacterium xerose
Streptococcus sp. α hemolytic
Escherichia coli No. 22
Bacillus subtilis ATCC 6633
Alcaligenes faecalis ATCC 10153
Proteus vulgaris ATCC 9484
Sarcina lutea ATCC 9341

The novel antibiotics of this invention are active against gram-positive and gram-negative microorganisms, such as, staphylococci, pneumococci, and streptococci. The novel compounds are thus potentially useful as therapeutic agents in treating bacterial infections in humans and animals caused by such microorganisms. The compounds can be usefully employed for controlling such infections by topical application or internal administration.

The usefulness of the novel compounds is demonstrated by their ability to control systemic lethal infections in mice. Thus the novel antibiotics of this invention show very high antibacterial in vivo activity in mice against Staphylococcus aureus, strain Smith, ranging by direct comparisons from about ½ to about 8 times the activity of tetracycline. Although the novel antibiotics of this invention have not as yet been clinically demonstrated to be useful in human therapy, the conditions of the tests in mice against human pathogens show a high probability of useful activity in humans.

The invention will be described in greater detail in conjunction with the following specific examples.

EXAMPLE 1

One part of mitomycin A is dissolved in 1,000 parts of water and 130 parts of ethylmercaptan is added to the purple solution. The color changes rapidly to pale orange. After one and one-half hours the solvent is removed by drying from the frozen state to give the crude orange antibiotic. The antibiotic is chromatographed using a diatomaceous earth packed column and a system consisting of 1 part heptane, 4 parts ethyl acetate, 3 parts methanol and 2 parts water. The ultraviolet spectrum of the new antibiotic exhibits maximum at 232, 283 and 333 m$\mu$ in methanol, whereas mitomycin A exhibits maxima at 212, 320 and 520 m$\mu$ in methanol. The $R_f$ of the new antibiotic is 0.81 as compared with 0.74 for mitomycin A when chromatographed as above. The new antibiotic is active against bacteria such as Bacillus subtilis.

EXAMPLE 2

The procedure of Example 1 is repeated using a series of different reagents. The results appear in the following table, the $R_f$ number being obtained by paper chromatography using the system described in Example 1.

Table I

| Reagent | Color | U.V.$\lambda_{max.}^{MeOH}$ | | | | $R_f$ |
|---|---|---|---|---|---|---|
| Methylmercaptan | Orange | | | | | .82 |
| Ethanedithiol | do | 242 | | 282 | | .75 |
| Benzylmercaptan | do | 232 | 282 | 336 | 450 | .81 |
| Propylmercaptan | do | 234 | 282 | 338 | 450 | .79 |
| Butylmercaptan | Red | 233 | 284 | 330 | 450 | .86 |
| Mercaptoethylamine | Yellow | 244 | 321 | | 470 | .78 |
| Mercaptoethanol | Brown | 238 | 283 | 336 | 450 | .76 |
| Cysteine | Yellow | 232 | 283 | 340 | 430 | |

EXAMPLE 3

One part of porfiromycin is dissolved in 1000 parts of water and a large excess of reagent in aqueous solution is added with stirring. After standing protected from light for fifteen hours, the solution is dried from the frozen state to obtain a new colored crude antibiotic which is purified by chromatography as in Example 1. The ultraviolet spectra of the new antibiotics exhibit characteristic maxima in methanol and have characteristic $R_f$ values in the same system as in Example 1. In this same system porfiromycin has an $R_f$ of 0.68. The new antibiotics are active against bacteria such as Bacillus subtilis.

This procedure is followed using different reagents. The results are tabulated in Table II, the $R_f$ values being measured in the same system as in Example 1.

Table II

| Reagent | Color | U.V.$\lambda_{max.}^{MeOH}$ | | | | $R_f$ |
|---|---|---|---|---|---|---|
| Ethylmercaptan | Purple | 215 | (230) | | 357 | .68 |
| Propylmercaptan | do | 213 | (230) | | 358 | .69 |
| Benzylmercaptan | do | 213 | (240) | | 358 | .69 |
| Mercaptoethanol | do | 211 | 250 | (310) | 357 | .68 |
| Ethanedithiol | do | 314 | 230 | 358 | | .70 |
| O-toluenethiol | do | 213 | 240 | 356 | | .68 |

EXAMPLE 4

One part of mitomycin C is dissolved in 1000 parts of water and an excess of reagent is added with stirring. The reaction is allowed to stand for fifteen hours in the dark and then the solvent is removed by drying from the frozen state to obtain the new antibiotics as colored solids. The crude antibiotics are purified by chromatography. The new antibiotics show characteristic ultraviolet spectra in methanol. Mitomycin C has an ultraviolet spectrum in methanol which shows maxima at 215, 358 and 550 m$\mu$. The new antibiotics have characteristic $R_f$ values in the system of Example 1, the $R_f$ of mitomycin C in that system being 0.38. The new antibiotics are active against bacteria such as Bacillus subtilis.

This procedure is followed using different reagents. The results are tabulated in Table III, the $R_f$ values being measured in the same system as in Example 1.

Table III

| Reagent | Color | U.V.$\lambda_{max.}^{MeOH}$ | | | | $R_f$ |
|---|---|---|---|---|---|---|
| Mercaptoethanol | Red | 200 530 | 250 | 308 | 350 | .36 |
| Ethylmercaptan | Purple | 214 | (230) | 358 | 550 | .34 |
| Benzylmercaptan | do | 214 | (241) | 358 | 530 | .39 |

A number of tests were made with some of the new antibiotics compared to one or more starting materials. Table IV shows inhibitory concentrations of the antibiotic porfiromycin and a new compound prepared by reacting porfiromycin with ethyl mercaptan.

Table IV

| | Porfiromycin | Porfiromycin plus ethyl mercaptan |
|---|---|---|
| Mycobacterium smegmatis ATCC 607 | 0.31 | 0.31 |
| Straphylococcus aureus ATCC 6538P | 0.15 | 0.15 |
| Sarcina lutea ATCC 9341 | 0.62 | 0.62 |
| Bacillus subtilis ATCC 6633 | 0.02 | 0.02 |
| Streptococcus faecilis ATCC 8043 | 1.25 | 1.25 |
| Pseudomonas aeruginosa ATCC 10145 | 5 | 10 |
| Corynebacterium xerose NRRL B1397 | 0.15 | 0.15 |
| Streptococcus pyogenes C203 | 0.02 | 0.02 |
| Streptococcus sp. γ hem. No. 11 | 0.15 | 0.31 |
| Staphylococcus albus No. 69 | 0.31 | 0.62 |
| Streptococcus sp. β hem. No. 89 | 0.04p / 0.15 | 0.31 |
| Staphylococcus aureus NY 104 | 0.31 | 0.31 |
| Bacillus cereus ATCC 10702 | 0.08 | 0.0p |
| Streptococcus pyogenes NY 5 | 0.01 | 0.028 |
| Klebsiella pneumoniae media lab No. 8 | 0.15 | 0.15 |
| Alcaligenes faecalis ATCC 10153 | 0.62 | 1.25 |
| Escherichia coli No. 22 | 10 | 10 |
| Klebsiella pneumoniae "A" Strain AD | 0.31 | 0.08p / 0.31 |

The data of Table IV is summarized in relative activity terms in Table V.

Table V

|  | Porfiromycin | Porfiromycin plus ethyl mercaptan |
|---|---|---|
| Mycobacterium smegmatis ATCC 607 | 8 | 8 |
| Staphylococcus aureus ATCC 6538P | 2 | 2 |
| Sarcina lutea ATCC 9341 | 1/32 | 1/32 |
| Bacillus subtilis ATCC 6633 | 8 | 8 |
| Streptococcus faecalis ATCC 8043 | 1 | 1 |
| Pseudomonas aeruginosa ATCC 10145 | 1/2 | 1 |
| Corynebacterium xerose NRRL B1397 | 1/4 | 1/4 |
| Streptococcus pyogenes C203 | 1 | 1 |
| Streptococcus sp., γ hem. No. 11 | 8 | 4 |
| Staphylococcus albus No. 69 | 1/2 | 1/4 |
| Streptococcus sp., β hem. No. 80 | 4 | 2 |
| Staphylococcus aureus NY 104 | 1 | 1 |
| Bacillus cereus ATCC 10702 | 16 | 16 |
| Streptococcus pyogenes NY 5 | 4 | 2 |
| Klebsiella pneumoniae media lab No. 8 | 4 | 4 |
| Alcaligenes faecalis ATCC 10153 | 1 | 1 |
| Escherichia coli No. 22 | 4 | 2 |
| Klebsiella pneumoniae "A" Strain AD | 4 | 4 |

Tests were also made with mitomycin A and a new product. As in Tables IV and V, there is a corresponding table giving relative activity for mitomycin A vs. the new reaction product. The data appear in Tables VI and VII.

Table VI

|  | Mitomycin A | Mitomycin A plus ethyl-mercaptan |
|---|---|---|
| Mycobacterium smegmatis ATCC 607 | 0.62p / 2.5 | 0.62 |
| Staphylococcus aureus ATCC 6538P | 0.31 | 2.5 |
| Sarcina lutea ATCC 9341 | 0.04 | 0.31 |
| Bacillus subtilis ATCC 6633 | 0.31 | 0.31 |
| Streptococcus faecalis ATCC 8043 | 1.25 | 2.5 |
| Pseudomonas aeruginosa ATCC 10145 | 10 | >10 |
| Proteus vulgaris ATCC 9484 | 1.25 |  |
| Escherichia coli ATCC 9637 | >10 |  |
| Salmonella gallinarum L.A.I. 604 | 10 |  |
| Corynebacterium xerose NRRL B1397 | 0.04 | 0.62 |
| Streptococcus pyogenes C 203 | 0.15 | 0.15 |
| Streptococcus sp., hem. No. 11 | 1.25 | 2.5 |
| Staphylococcus albus No. 69 | 0.31 | 1.25 |
| Streptococcus sp. β hem. No. 80 | 1.25 | 2.5 |
| Staphylococcus aureus NY 104 | 0.31 | 1.25 |
| Bacillus cereus ATCC 10702 | 0.62 | 0.31 |
| Streptococcus pyogenes NY 5 | 0.04 | 0.15 |
| Klebsiella pneumoniae media lab No. 8 | 1.25 | 2.5 |
| Alcaligenes faecalis ATCC 10153 | 2.5 | 5 |
| Escherichia coli No. 22 | 1.25 | 5 |
| Klebsiella pneumoniae "A" Strain AD | 1.25 | 2.5 |

Table VII

|  | Mitomycin A plus ethyl mercaptan |
|---|---|
| Mycobacterium smegmatis ATCC 607 |  |
| Staphylococcus aureus ATCC 6538P | 1/8 |
| Sarcina lutea ATCC 9341 | 1/8 |
| Bacillus subtilis ATCC 6633 | 1/2 |
| Streptococcus faecalis ATCC 8043 | 1/2 |
| Pseudomonas aeruginosa ATCC 10145 | ≤1/2 |
| Corynebacterium xerose NRRL B1397 | 1/16 |
| Streptococcus pyogenes C203 | 1/8 |
| Streptococcus sp. γ hem. No. 11 | 1/2 |
| Staphylococcus albus No. 69 | 1/4 |
| Streptococcus sp. β hem. No. 80 | 1/2 |
| Staphylococcus aureus NY 104 | 1/4 |
| Bacillus cereus ATCC 10702 | 1 |
| Streptococcus pyogenes NY 5 | 1/4 |
| Klebsiella pneumoniae medium lab No. 8 | 1/2 |
| Alcaligenes faecalis ATCC 10153 | 1 |
| Escherichia coli No. 22 | 1/4 |
| Klebsiella pneumoniae "A" Strain AD | 1/2 |

In the foregoing tables wherever the inhibition was not 100% complete the notation "p" is used to denote that the inhibition was partial although nearly complete.

U.V. data, where given, occasionally show a wave length in parenthesis. This denotes a point of inflection and not a clear maximum.

What is claimed is:
1. The product of the reaction of a mercapto compound having the formula R—SH wherein R is selected from the group consisting of lower alkyl, mercapto lower alkyl, hydroxyl lower alkyl, amino lower alkyl, phenyl and phenyl lower alkyl with a compound of the formula:

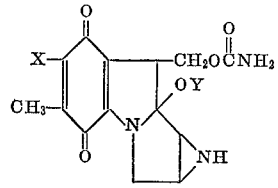

wherein X is selected from the group consisting of amino and lower alkoxy; and Y is selected from the group consisting of hydrogen and methyl; said reaction being carried out in a non-acidic solvent inert to the reactants at a temperature of from about 0° C. to about 30° C.

2. The product of the reaction of ethyl mercaptan with mitomycin A, said reaction being carried out in a non-acidic solvent inert to the reactants at a temperature of from about 0° C. to about 30° C.

3. The product of the reaction of ethyl mercaptan with porfiromycin, said reaction being carried out in a non-acidic solvent inert to the reactants at a temperature of from about 0° C. to about 30° C.

No references cited.

NICHOLAS S. RIZZO, *Primary Examiner.*